US012732888B2

(12) United States Patent
Chu et al.

(10) Patent No.: US 12,732,888 B2
(45) Date of Patent: Sep. 8, 2026

(54) WIRELESS COMMUNICATIONS THROUGH WIRELESS RELAY DEVICE

(71) Applicant: NXP USA, Inc., Austin, TX (US)

(72) Inventors: Liwen Chu, San Ramon, CA (US); Rui Cao, Sunnyvale, CA (US); Kiseon Ryu, San Diego, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 301 days.

(21) Appl. No.: 18/382,457

(22) Filed: Oct. 20, 2023

(65) Prior Publication Data

US 2024/0137836 A1 Apr. 25, 2024
US 2024/0236810 A9 Jul. 11, 2024

Related U.S. Application Data

(60) Provisional application No. 63/380,255, filed on Oct. 20, 2022.

(51) Int. Cl.
*H04W 40/22* (2009.01)
*H04W 84/12* (2009.01)

(52) U.S. Cl.
CPC ........... *H04W 40/22* (2013.01); *H04W 84/12* (2013.01)

(58) Field of Classification Search
CPC ...... H04W 40/22; H04W 84/12; H04W 88/04
See application file for complete search history.

(56) References Cited

U.S. PATENT DOCUMENTS

2012/0135677 A1* 5/2012 Hsu .................... H04B 7/15507 455/11.1
2016/0157158 A1* 6/2016 Jeong .................... H04W 40/22 370/315

* cited by examiner

*Primary Examiner* — Jamal Javaid

(57) ABSTRACT

Embodiments of a method and apparatus for wireless communications are disclosed. In an embodiment, a wireless device includes a controller configured to select a wireless relay device from multiple wireless relay devices for data exchanges between the wireless device and a second wireless device and a wireless transceiver configured to exchange data with the second wireless device through the selected wireless relay device.

15 Claims, 6 Drawing Sheets

WIRELESS COMMUNICATIONS THROUGH WIRELESS RELAY DEVICE

CROSS-REFERENCE TO RELATED APPLICATIONS

This application is entitled to the benefit of U.S. Provisional Patent Application Ser. No. 63/380,255, filed on Oct. 20, 2022, the contents of which are incorporated by reference herein.

BACKGROUND

Wireless communications devices, e.g., access points (APs) or non-AP devices can transmit various types of information using different transmission techniques. For example, various applications, such as, Internet of Things (IoT) applications can conduct wireless local area network (WLAN) communications, for example, based on Institute of Electrical and Electronics Engineers (IEEE) 802.11 family of standards (e.g., Wi-Fi standards). Some applications, for example, video surveillance applications, outdoor video sharing applications, etc., require relatively high system throughput as well as good network coverage. Therefore, there is a need for wireless communications through a wireless relay device that can provide wireless transmission range extension (ER).

SUMMARY

Embodiments of a method and apparatus for wireless communications are disclosed. In an embodiment, a wireless device includes a controller configured to select a wireless relay device from multiple wireless relay devices for data exchanges between the wireless device and a second wireless device and a wireless transceiver configured to exchange data with the second wireless device through the selected wireless relay device. Other embodiments are also disclosed.

In an embodiment, the wireless relay devices are located between the wireless device and the second wireless device.

In an embodiment, the wireless device includes a leaf station (STA) (LSTA), and the second wireless device includes a wireless access point (AP).

In an embodiment, the wireless relay devices are located between the LSTA and the wireless AP.

In an embodiment, the wireless transceiver is further configured to broadcast a polling frame to the wireless relay devices.

In an embodiment, the wireless transceiver is further configured to receive polling reports from the wireless relay devices in response to the polling frame, and the controller is further configured to select the wireless relay device from the wireless relay devices for data exchanges between the wireless device and the second wireless device based on the polling reports.

In an embodiment, the wireless transceiver is further configured to receive a polling report collection from the second wireless device that is generated in response to polling reports from the wireless relay devices that is received at the second wireless device in response to the polling frame.

In an embodiment, the controller is further configured to select the wireless relay device from the wireless relay devices for data exchanges between the wireless device and the second wireless device based on the polling report collection.

In an embodiment, the controller is further configured to generate a frame confirming wireless relay device selection, and the wireless transceiver is further configured to transmit the frame to the second wireless device.

In an embodiment, the controller is further configured to generate a frame confirming wireless relay device selection, and the wireless transceiver is further configured to transmit the frame to the selected wireless relay device.

In an embodiment, the wireless transceiver is further configured to transmit to the second wireless device a downlink relay station forwarding advice that is based on physical layer protocol data units (PPDUs) transmitted by the second wireless device or to receive an uplink (UL) relay station forwarding advice from the second wireless device.

In an embodiment, a wireless leaf station (STA) (LSTA) compatible with an Institute of Electrical and Electronics Engineers (IEEE) 802.11 protocol includes a controller configured to select a wireless relay device from multiple wireless relay devices for data exchanges between the wireless LSTA and a wireless AP and a wireless transceiver configured to exchange data with the wireless AP through the selected wireless relay device. The wireless relay devices are located between the wireless LSTA and the wireless AP.

In an embodiment, the wireless transceiver is further configured to broadcast a polling frame to the wireless relay devices.

In an embodiment, the wireless transceiver is further configured to receive polling reports from the wireless relay devices in response to the polling frame, the controller is further configured to select the wireless relay device from the wireless relay devices for data exchanges between the wireless LSTA and the second wireless device based on the polling reports and to generate a frame confirming wireless relay device selection, and the wireless transceiver is further configured to transmit the frame confirming the wireless relay device selection to the wireless AP.

In an embodiment, a method for wireless communications involves at a first wireless device, selecting a wireless relay device from multiple wireless relay devices for data exchanges between the first wireless device and a second wireless device and at the first wireless device, exchanging data with the second wireless device through the selected wireless relay device.

In an embodiment, the wireless relay devices are located between the first wireless device and the second wireless device.

In an embodiment, the first wireless device includes a leaf station (STA) (LSTA), the second wireless device includes a wireless access point (AP), and the wireless relay devices are located between the LSTA and the wireless AP.

In an embodiment, the method further includes from the first wireless device, broadcasting a polling frame to the wireless relay devices.

In an embodiment, the method further includes at the first wireless device, receiving polling reports from the wireless relay devices in response to the polling frame, where at the first wireless device, selecting the wireless relay device from the wireless relay devices for data exchanges between the first wireless device and the second wireless device includes at the first wireless device, selecting the wireless relay device from the wireless relay devices for data exchanges between the first wireless device and the second wireless device based on the polling reports.

In an embodiment, the method further includes receiving a polling report collection from the second wireless device that is generated in response to a plurality of polling reports from the wireless relay devices that is received at the second wireless device in response to the polling frame, where at the first wireless device, selecting the wireless relay device from the wireless relay devices for data exchanges between the first wireless device and the second wireless device includes at the first wireless device, selecting the wireless relay device from the wireless relay devices for data exchanges between the first wireless device and the second wireless device based on the polling report collection.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
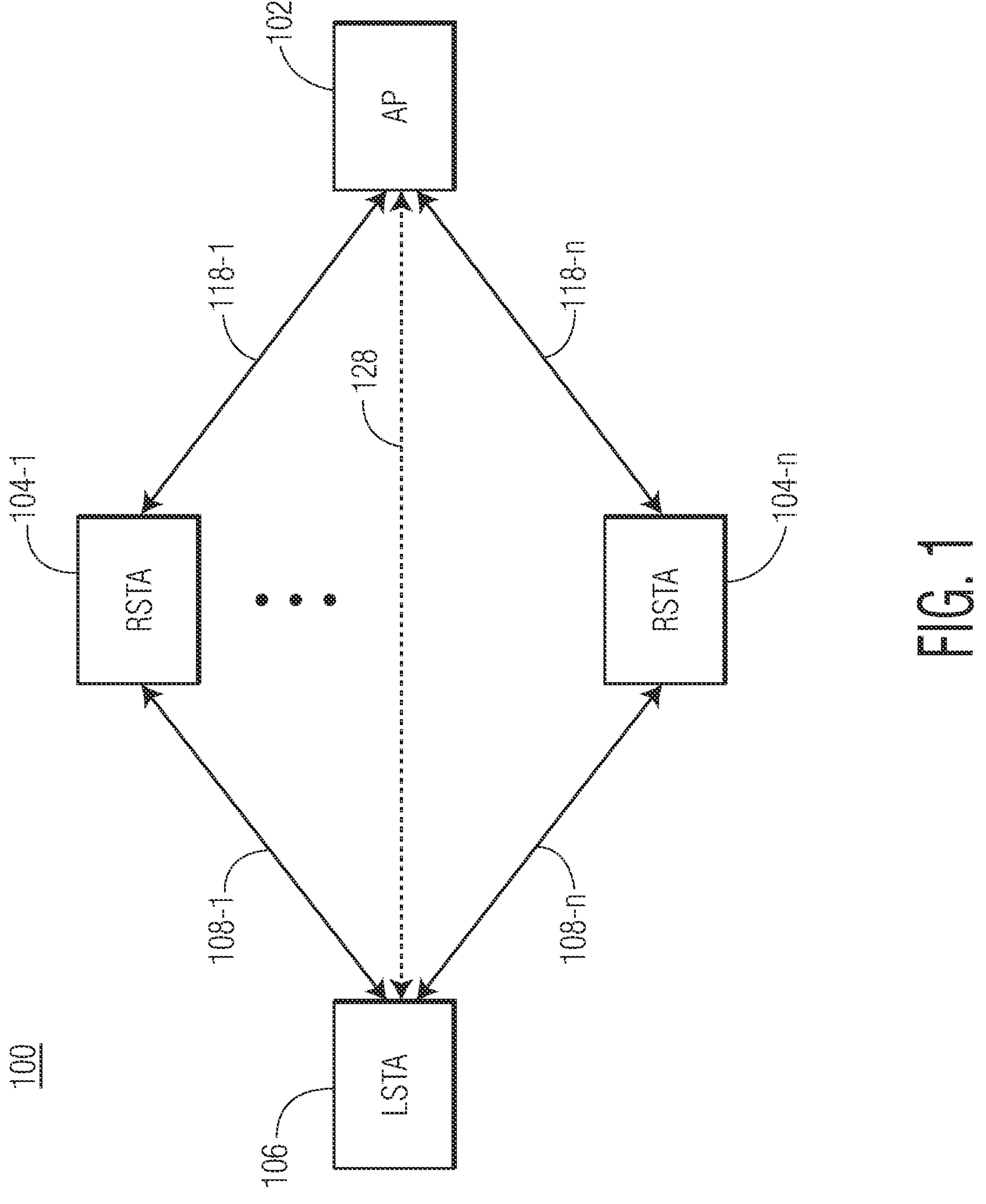
FIG. 1 depicts a wireless communications system with relay transmission capabilities in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Range extension (ER) physical layer protocol data unit (PPDU) formats are introduced from IEEE 802.11ax and carried over to IEEE 802.11be and beyond. Direct sequence spread spectrum (DSSS) is also defined in IEEE 802.11b in 2.4 gigahertz (GHz) band with longer range. However, these ER physical layer (PHY) modes can extend the transmission range with limited 3 dB~6 dB, and the sustainable data rate is reduced to 1~3 megabits per second (mbps). Relay forwarding has been defined as independent transmission for each hop, which induced long latency and jitter. For example, typical WiFi extender/repeater/boosters have long end-to-end latency, high jitter, and low throughput. In a WiFi mesh router or EasyMesh program, each mesh router is interconnected with another mesh router through either wire or wireless. For wireless connection, every AP can relay the data from a master AP to its own stations (STAs). Each mesh node has a full function AP and at least one full function STA, thus is not cost effective. The AP relaying protocol is built on top of existing IEEE 802.11 Media Access Control (MAC)/PHY components, latency/jitter is also high compared to single-hop case. For IEEE 802.11 11ah/ad relaying mode, end to end latency and throughput may not be guaranteed with hop-by-hop block acknowledgement (BA)/acknowledgement (ACK) agreement and security protocol.

FIG. 1 depicts a wireless (e.g., WiFi) communications system 100 with relay transmission capabilities in accordance with an embodiment of the invention. In the embodiment depicted in FIG. 1, the wireless communications system 100 includes an AP 102, multiple relay stations (STAs) (RSTAs) 104-1, . . . , **104-*n*, where n is a positive integer greater than one, and a leaf STA (LSTA) 106. The RSTAs are located in the signal path between the AP and the LSTA and are configured to forward data between the AP and the LSTA. In some embodiments, the LSTA is a non-AP STA that is associated with the AP and that is affiliated or not affiliated with a non-AP multi-link device (MLD). In some embodiments, the RSTAs are configured to, either individually or cooperatively, decode and forward data that is received from the AP to the LSTA and/or from the LSTA to the AP. The wireless communications system can be used in various applications, such as industrial applications, medical applications, computer applications, and/or consumer or enterprise applications. In some embodiments, the wireless communications system is compatible with an IEEE 802.11 protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes multiple APs with one RSTA and one LSTA, multiple APs with multiple RSTAs and one LSTA, multiple APs with one RSTA and multiple LSTAs, multiple APs with multiple RSTAs and multiple LSTAs, one AP with one RSTA and multiple LSTAs, or one AP with multiple RSTAs and multiple LSTAs. In another example, although the wireless communications system is shown in FIG. 1 as being connected in a certain topology, the network topology of the wireless communications system is not limited to the topology shown in FIG. 1. In some embodiments, the wireless communications system 100 described with reference to FIG. 1 involves single-link communications and the AP 102, the RSTAs 104-1, . . . , 104-*n*, and the LSTA 106 communicate through single communications links. In some embodiments, the wireless communications system 100 described with reference to FIG. 1 involves multi-link communications and the AP 102, the RSTAs 104-1, . . . , 104-*n*, and the LSTA 106** communicate through multiple communications links. Furthermore, the techniques described herein may also be applicable to each link of a multi-link communications system.

In the embodiment depicted in FIG. 1, the AP 102 may be implemented in hardware (e.g., circuits), software, firmware, or a combination thereof. The AP 102 may be fully or partially implemented as an integrated circuit (IC) device. In some embodiments, the AP 102 is a wireless AP compatible with at least one WLAN communications protocol (e.g., at least one IEEE 802.11 protocol). In some embodiments, the AP is a wireless AP that connects to a local area network (LAN) and/or to a backbone network (e.g., the Internet) through a wired connection and that wirelessly connects to one or more wireless stations (STAs), for example, through one or more WLAN communications protocols, such as an IEEE 802.11 protocol. In some embodiments, the AP includes at least one antenna, at least one transceiver operably connected to the at least one antenna, and at least one controller operably connected to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, the AP 102 (e.g., a controller or a transceiver of the AP 102) implements upper layer Media Access Control (MAC) functionalities (e.g., beacon acknowledgement establishment, reordering of frames, etc.) and/or lower layer MAC functionalities (e.g., backoff, frame transmission, frame reception, etc.). Although the wireless communications system 100 is shown in FIG. 1 as including one AP, other embodiments of the wireless communications system 100 may include multiple APs. In these embodiments, each of the APs of the wireless communications system 100 may operate in a different frequency band. For example, one AP may operate in one frequency band of 2.4 GHz, 5 GHz, 6 GHz, 45 GHz, and 60 GHz frequency bands and another AP may operate in another frequency band of 2.4 GHz, 5 GHz, 6 GHz, 45 GHz, and 60 GHz frequency bands.

In the embodiment depicted in FIG. 1, the RSTAs 104-1, . . . , **104-*n* and the LSTA 106 may be implemented in hardware (e.g., circuits), software, firmware, or a combination thereof. The RSTAs 104-1, . . . , 104-*n* and the LSTA 106 may be fully or partially implemented as IC devices. In some embodiments, at least one of the RSTAs 104-1, . . . , 104-*n* and the LSTA 106 is a communications device compatible with at least one IEEE 802.11 protocol. In some embodiments, at least one of the RSTAs 104-1, . . . , 104-*n* and the LSTA 106 is implemented in a laptop, a desktop personal computer (PC), a mobile phone, or other communications device that supports at least one WLAN communications protocol. In some embodiments, at least one of the RSTAs 104-1, . . . , 104-*n* and the LSTA 106 implements a common MAC data service interface and a lower layer MAC data service interface. In some embodiments, each of the RSTAs 104-1, . . . , 104-*n* and the LSTA 106** includes at least one antenna, at least one transceiver operably connected to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver.

In the embodiment depicted in FIG. 1, the AP 102 communicates with each of the RSTAs 104-1, . . . , **104-*n* via a communication link (e.g., a wireless link) 108-1, . . . , or 108-*n*, and each of the RSTAs 104-1, . . . , 104-*n* communicates with the LSTA 106 via a communication link (e.g., a wireless link) 118-1, . . . , or 118-*n*. The RSTAs are located between the AP and the LSTA to forward data to the LSTA (e.g., decode and forward data received from the AP to the LSTA) and/or to forward data to the AP (e.g., decode and forward data received from the LSTA to the AP), either individually or cooperatively. In some embodiments, data communicated between the AP, the RSTAs, and the LSTA includes MAC protocol data units (MPDUs). An MPDU may include a frame header, a frame body, and a trailer with the MPDU payload encapsulated in the frame body. When data transfer is performed with two channel access, the system throughput of the wireless communications system 100 depicted in FIG. 1 may be halved linearly. The RSTAs provide flexibility to achieve higher rate with shorter communications links. In some embodiments, the AP 102 can directly communicate with the LSTA 106 via a communication link 128. Compared to the communications links 108-1, . . . , 108-*n*, 118-1, . . . , 118-*n*, the communication link 128 can have two times of distance, which corresponds to around 8 dB propagation loss (2.7 decaying exponent). To maintain the communication link 128, 8 dB better sensitivity and new PHY design is needed, the data rate is reduced to around ⅛ and physical layer protocol data unit (PPDU) airtime increases by 8 times. Although the AP 102, the RSTAs 104-1, . . . , 104-*n*, and the LSTA 106 are depicted in FIG. 1 as wirelessly communicating to each other via a corresponding communications link, in other embodiments, the AP 102, the RSTAs 104-1, . . . , 104-*n*, and the LSTA 106 may wirelessly communicate to each other via multiple communication links. In some embodiments, for point-to-point (P2P) communications, the AP 102 is replaced by another LSTA. In some embodiments, at least one of the RSTAs 104-1, . . . , 104-*n* includes a relay STA that performs frame exchanges with the AP 102 and a relay AP that performs frame exchanges with the LSTA 106** and a relay functionality between the relay STA and the relay AP.

The RSTAs 104-1, . . . , **104-*n* may be used when the associated AP 102 cannot reach a faraway LSTA (e.g., the LSTA 106) with high Modulation and Coding Scheme (MCS), number of spatial streams (NSS) or cannot reach a faraway STA (e.g., the LSTA 106) with the lowest MCS. The uplink (UL) frame transmission between the LSTA and the AP may be done by PPDUs transmitted from the LSTA to the RSTAs 104-1, . . . , 104-*n* and PPDUs transmitted by the RSTAs 104-1, . . . , 104-*n* to the AP. The downlink (DL) frame transmission between the AP and LSTA may be done by PPDUs transmitted by the AP to the RSTAs 104-1, . . . , 104-*n* and PPDUs transmitted by the RSTAs 104-1, . . . , 104-*n* to the LSTA. The block acknowledgement (BA)/acknowledgement (ACK) can be end-to-end or hop-by-hop. With end-to-end BA, the DL BA transmitted by the AP may acknowledge the soliciting UL Aggregate MAC Protocol Data Unit (A-MPDU)/block acknowledgement request (BAR) from the LSTA that is forwarded by the RSTAs 104-1, . . . , 104-*n*, and the DL BA transmitted by the AP may acknowledge the soliciting A-MPDU/BAR from the LSTA that is forwarded by the RSTAs 104-1, . . . , 104-*n*. With hop-by-hop DL BA, the DL BA transmitted by the AP may acknowledge the soliciting UL A-MPDU/BAR from the RSTAs 104-1, . . . , 104-*n*, and the DL BA transmitted by the RSTA may acknowledge the soliciting UL A-MPDU/BAR from the LSTA. With hop-by-hop UL BA, the UL BA transmitted by the RSTAs 104-1, . . . , 104-*n* may acknowledge the soliciting DL A-MPDU/BAR from the AP, and the UL BA transmitted by the LSTA may acknowledge the soliciting DL A-MPDU/BAR from the RSTAs 104-1, . . . , 104-*n***.

Figure 2:
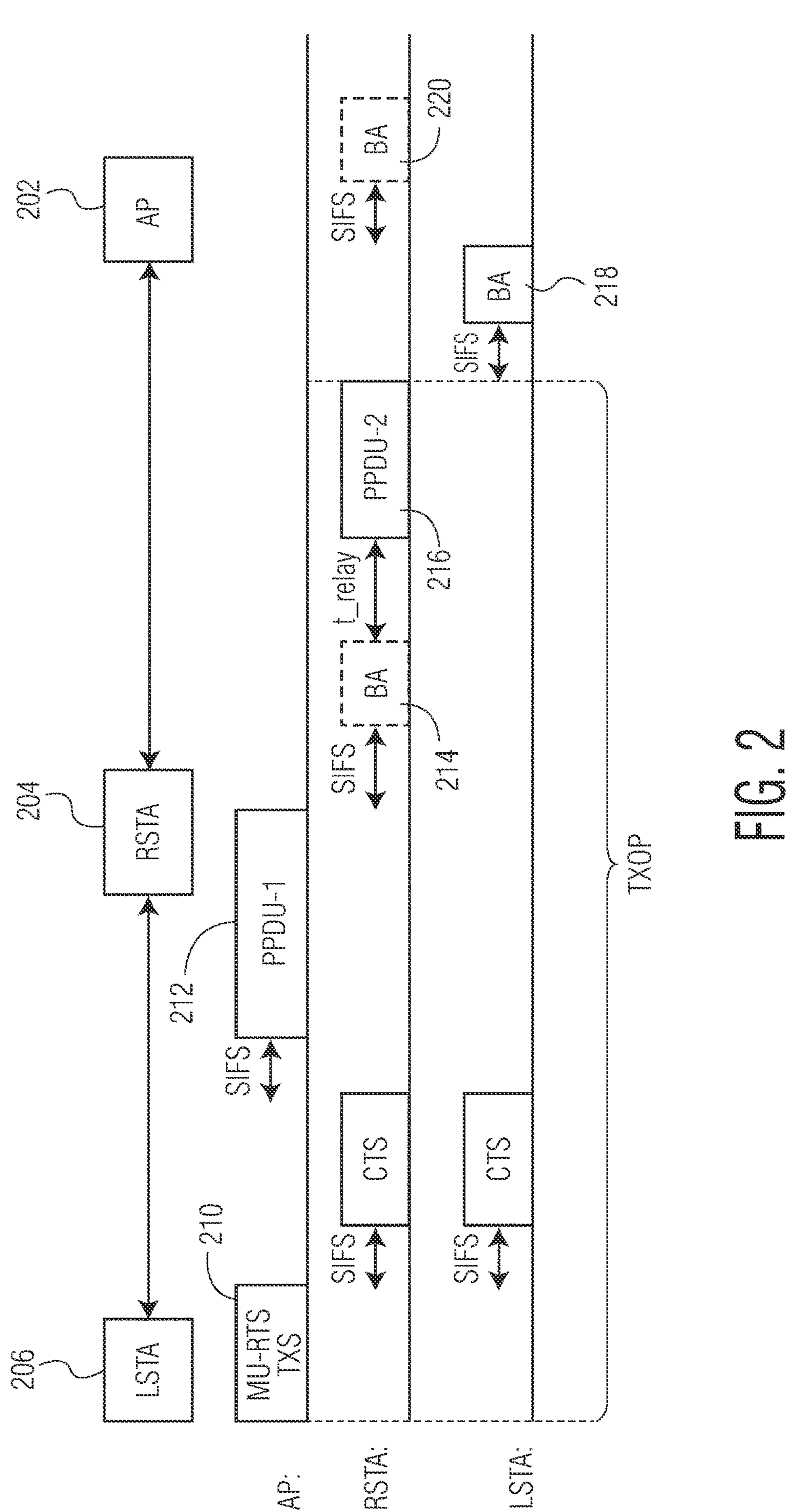
FIG. 2 depicts a frame exchange sequence diagram between an access point (AP), a relay station (RSTA), and a leaf station (LSTA).

FIG. 2 depicts a frame exchange sequence diagram between an AP 202, an RSTA 204, and an LSTA 206. In the frame exchange sequence diagram depicted in FIG. 2, the AP 202 may be implemented the same as or similar to the AP 102 depicted in FIG. 1, while the RSTA 204 and the LSTA 206 may be implemented the same as or similar to the RSTA 104-1, . . . , or **104-*n* and the LSTA 106 depicted in FIG. 1, respectively. In the frame exchange sequence diagram depicted in FIG. 2, transmit opportunity (TXOP) sharing relay communications with one relay are implemented. A Multi User Request to Send (MU-RTS) triggered TXOP sharing (TXS) frame 210 may be sent by the AP 202 to reserve the TXOP for both hops (i.e., the AP 202 and the RSTA 204), and a portion of the TXOP is shared with the RSTA 204. The RSTA and/or the LSTA may transmit a Clear to Send (CTS) message or frame in response to the MU-RTS TXS frame. The AP transmits a Physical layer Protocol Data Unit (PPDU) PPDU-1 212 to the RSTA 204. For example, in the MU-RTS TXS frame, the AP reserves a 5 milliseconds (ms) TXOP, out of which 3 ms is allocated to the RSTA, and the AP uses 2 ms for PPDU-1 212 transmission. The RSTA 204 can perform data forwarding by decoding and forwarding. The transmission of BA 214 from the RSTA back to the AP may be either skipped or performed if an end-to-end BA agreement is set up. The relay processing delay (t_relay) is either pre-defined for any relays (e.g., being equal to Short Interframe Spacing (SIFS)), or per-determined by the RSTA. The RSTA forwards or retransmits successfully received MPDUs carried in PPDU-1 in a Physical layer Protocol Data Unit (PPDU) PPDU-2 216 to the LSTA. The LSTA 206 sends a BA 218 back to the RSTA, which may send an optional BA 220 back to the AP 202. PPDU-2's Modulation and Coding Scheme (MCS)/number of spatial streams (NSS) may be informed to the RSTA with the information embedded in PPDU-1 or in a separate management frame. If the TXOP duration is not sufficient, the RSTA may choose to drop some MPDUs. In some embodiments, for point-to-point (P2P) communications, the AP 202 is replaced by another LSTA. In some embodiments, the RSTA 204 includes a relay STA that performs frame exchanges with the AP 202 and a relay AP that performs frame exchanges with the LSTA 206** and a relay functionality between the relay STA and the relay AP.

In some embodiments, a procedure to select one of the RSTAs (e.g., the RSTAs 104-1, . . . , **104-*n*) for frame forwarding between an LSTA (e.g., the LSTA 106) and an AP (e.g., the AP 102**) is defined when blind forwarding is not allowed and there are multiple RSTAs in a basic service set (BSS).

In some embodiments, RSTA's measurement is forwarded by an AP. For example, RSTA's measurement includes RSTA Polling Reports that may contain received signal strength indicators (RSSIs) at several RSTAs, which can be collected at by an AP and forwarded by the AP to a corresponding LSTA. In some embodiments, an LSTA that tries to select one of RSTAs transmits a broadcast public action frame (e.g., a RSTA Polling frame) for RSTA selection. The broadcast public action frame (e.g., the RSTA Polling frame) may be broadcasted multiple times for RSTA's correct reception. In some embodiments, each RSTA that receives the broadcast public action frame (e.g., the RSTA Polling frame) reports information, such as, the reception of RSTA Polling, the received signal strength indicator (RSSI) of the received frame, and/or the LSTA's Address to a corresponding AP. This report frame may be a unicast action frame (e.g., RSTA Polling Report as a robust/protected Action frame) and can be encrypted by a key (e.g., the Pairwise Transient Key (PTK)) of the RSTA. In some embodiments, after collecting the RSTA polling reports from the RSTAs, the AP sends the RSTA report collection to the LSTA. This report collection frame may be a unicast Action frame (e.g., RSTA Polling Report Collection as a robust/protected Action frame) and can be encrypted by a key (e.g., the PTK) of the AP. The RSTA Polling report collection frame may include at least one of a recommended RSTA's address/identifier (e.g., MAC address, Association ID (AID), etc.), and one or more received signal strength indicators (RSSIs) of the received frame (e.g., the received RSTA Polling frame) with one or more RSTAs' addresses/identifiers. After receiving the RSTA Polling report collection from the AP, the LSTA selects one RSTA as its forwarding RSTA.

In some embodiments, RSTA's unicast measurement frame is transmitted to a STA. In some embodiments, an LSTA that tries to select one of RSTAs transmits a broadcast public Action frame (e.g., a RSTA Polling Request frame) for RSTA selection. The broadcast public action frame (e.g., the RSTA Polling frame) may be broadcasted several times for RSTA's correct reception. In some embodiments, each RSTA that receives the broadcast public action frame (e.g., the RSTA Polling frame) reports information, such as, the reception of RSTA Polling, the RSSI of the received frame, the LSTA's Address, the RSTA's Address and/or Association ID (AID) to the LSTA. One variant is that this report frame is a unicast Action frame (e.g., a RSTA Polling Report as a robust/protected Action frame) and can be encrypted. After receiving the RSTA polling reports from the RSTAs, the LSTA selects one RSTA as its forwarding RSTA.

Some examples of operations to be performed once an LSTA selects one RSTA as its forwarding RSTA is described as follows. In a first option, the LSTA may transmit to the AP a unicast protected action frame confirming its RSTA selection. The frame may include the information about the forwarding direction, such as, the selected RSTA, downlink (DL) and uplink (UL), or UL only, etc. The AP receiving the frame indicating the RSTA selection from the LSTA may transmit a unicast protected action frame to the selected RSTA such that the RSTA can transmit a DL frame either directly to the LSTA or to the LSTA via the AP. In a second option, the LSTA may transmit to the selected RSTA a frame confirming its RSTA selection. The frame may include the information about the forwarding direction such as DL and UL, or UL only, etc. The RSTA receiving the frame indicating the RSTA selection from the LSTA transmits the frame to the AP such that the AP can transmit a DL frame either directly to the LSTA or to the LSTA via the RSTA.

Figure 3:
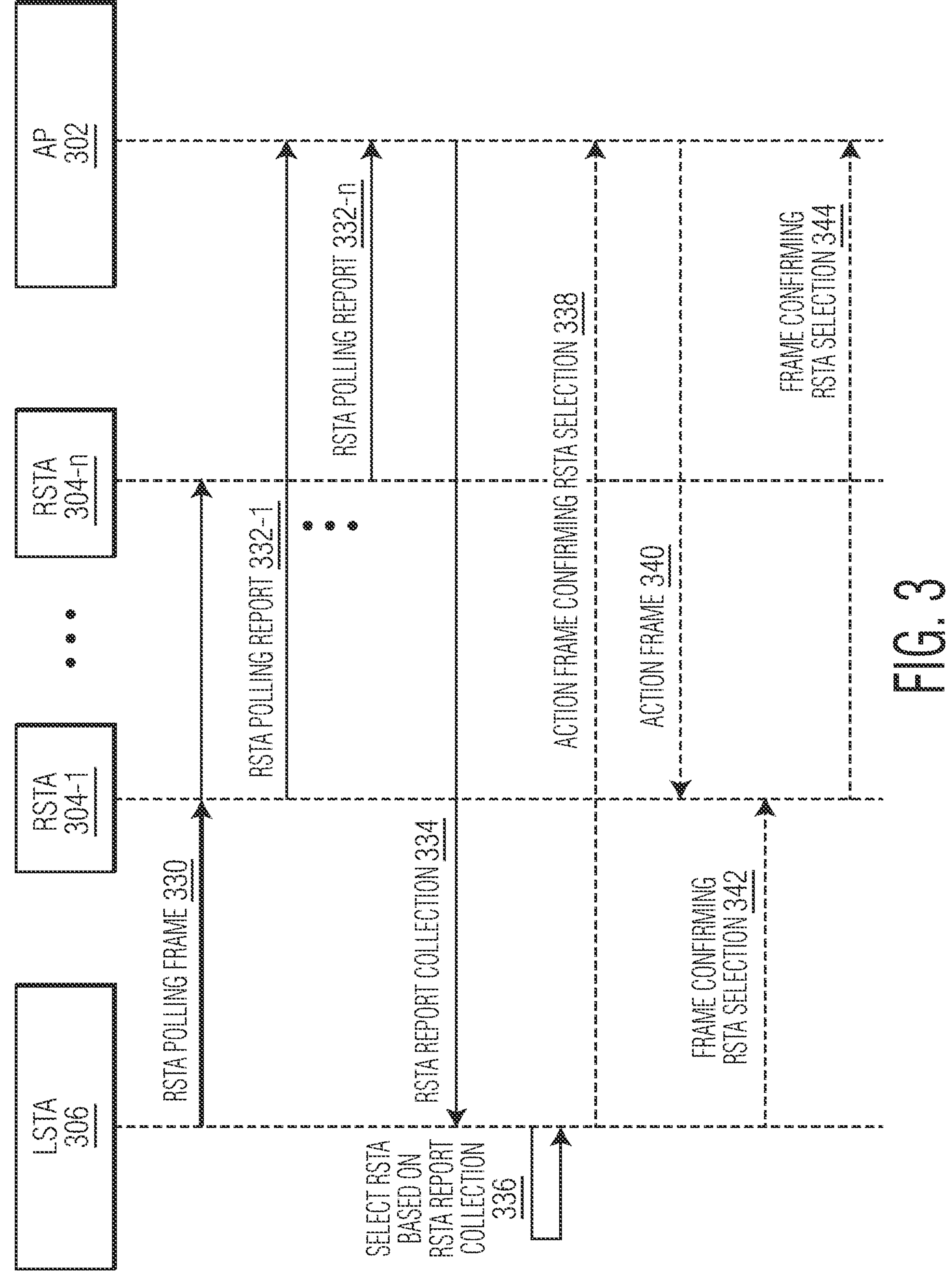
FIG. 3 shows a swim-lane diagram illustrating an example procedure of selecting an RSTA from multiple RSTAs, for frame forwarding between an LSTA and an AP.

FIG. 3 shows a swim-lane diagram illustrating an example procedure of selecting an RSTA from multiple RSTAs 304-1, . . . , 304-*n*, where n is a positive integer that is greater than one, for frame forwarding between an LSTA 306 and an AP 302. In this RSTA selection procedure, RSTA's measurement is forwarded by the AP 302. The AP 302 depicted in FIG. 3 may be an embodiment of the AP 102 depicted in FIG. 1, the RSTAs 304-1, . . . , 304-*n* depicted in FIG. 3 may be embodiments of the RSTAs 104-1, . . . , 104-*n* depicted in FIG. 1, and/or the LSTA 306 depicted in FIG. 3 may be an embodiment of the LSTA 106 depicted in FIG. 1. In operation 330, the LSTA 306 transmits a broadcast RSTA Polling frame for RSTA selection to the RSTAs 304-1, . . . , 304-*n*. The RSTA Polling frame may be broadcasted multiple times for RSTA's correct reception. In operations 332-1, . . . , 332-*n*, each of the RSTAs 304-1, . . . , 304-*n* that receives the RSTA Polling frame generate and transmit RSTA polling reports that contain information, such as, the reception of RSTA Polling, the received signal strength indicator (RSSI) of the received RSTA Polling frame, and/or the LSTA's Address to the AP 302. The RSTA polling reports may be implemented as unicast action frames, which can be encrypted by a key (e.g., the Pairwise Transient Key (PTK)) of the RSTAs 304-1, . . . , 304-*n*. In operation 334, after collecting the RSTA polling reports from the RSTAs 304-1, . . . , 304-*n*, the AP 302 sends an RSTA report collection frame, which may be a unicast Action frame (e.g., RSTA Polling Report Collection as a robust/protected Action frame) and can be encrypted by a key (e.g., the PTK) of the AP 302, to the LSTA 306. In operation 336, after receiving the RSTA report collection from the AP 302, the LSTA 306 selects one RSTA as its forwarding RSTA, for example, based on the received signal strength indicator (RSSI) of the RSTA Polling frame at the RSTAs 304-1, . . . , 304-*n* (e.g., by selecting the RSTA with the highest RSSI value). After the LSTA 306 selects one RSTA as its forwarding RSTA, the LSTA may transmit a unicast protected action frame confirming its RSTA selection, which may include the information about the forwarding direction, such as, the selected RSTA, downlink (DL) and uplink (UL), or UL only, etc., to the AP 302 in operation 338 and the AP may transmit a unicast protected action frame to the selected RSTA (e.g., the RSTA 304-1 in FIG. 3) in operation 340 such that the RSTA can transmit a DL frame either directly to the LSTA 306 or to the LSTA 306 via the AP 302. Alternatively, after the LSTA 306 selects one RSTA as its forwarding RSTA, the LSTA may transmit to the selected RSTA (e.g., the RSTA 304-1 in FIG. 3) a frame, which may include the information about the forwarding direction such as DL and UL, or UL only, etc., confirming its RSTA selection in operation 342 and the selected RSTA 304-1 transmits the frame to the AP 302 such that the AP 302 can transmit a DL frame either directly to the LSTA 306 or to the LSTA 306 via the RSTA 304-1.

Figure 4:
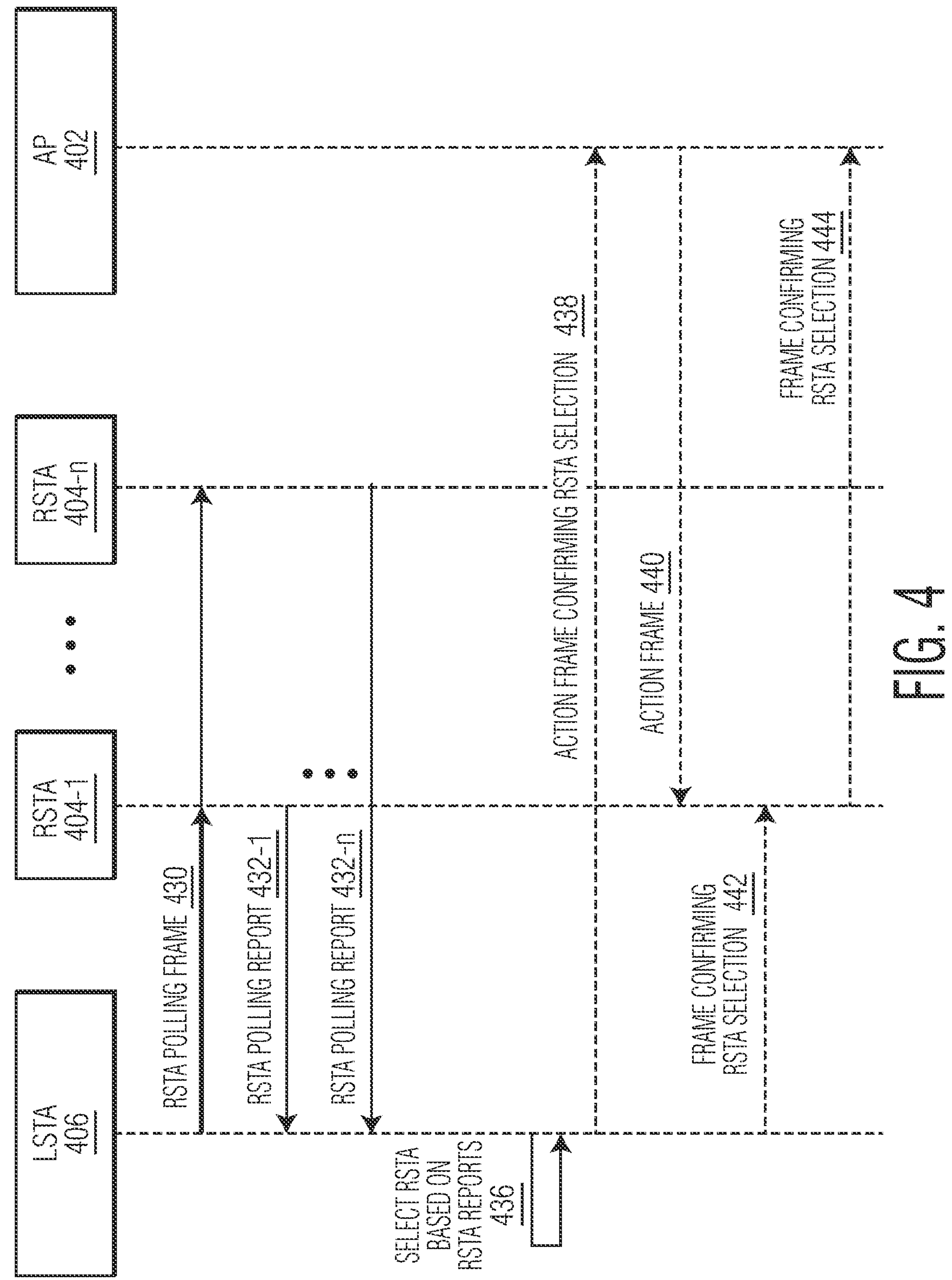
FIG. 4 shows a swim-lane diagram illustrating an example procedure of selecting an RSTA from multiple RSTAs, for frame forwarding between an LSTA and an AP.

FIG. 4 shows a swim-lane diagram illustrating an example procedure of selecting an RSTA from multiple RSTAs 404-1, . . . , 404-*n*, where n is a positive integer that is greater than one, for frame forwarding between an LSTA 406 and an AP 402. In this RSTA selection procedure, RSTA's unicast measurement frame is transmitted to the LSTA 406. The AP 402 depicted in FIG. 4 may be an embodiment of the AP 102 depicted in FIG. 1, the RSTAs 404-1, . . . , 404-*n* depicted in FIG. 4 may be embodiments of the RSTAs 104-1, . . . , 104-*n* depicted in FIG. 1, and/or the LSTA 406 depicted in FIG. 4 may be an embodiment of the LSTA 106 depicted in FIG. 1. In operation 430, the LSTA 406 transmits a broadcast RSTA Polling frame for RSTA selection to the RSTAs 404-1, . . . , 404-*n*. The RSTA Polling frame may be broadcasted multiple times for RSTA's correct reception. In operations 432-1, . . . , 432-*n*, each of the RSTAs 404-1, . . . , 404-*n* that receives the RSTA Polling frame generate and transmit RSTA polling reports that contain information, such as, the reception of RSTA Polling, the RSSI of the received RSTA Polling frame, and/or the LSTA's Address to the LSTA 406. The RSTA polling reports may be implemented as unicast action frames, which can be encrypted by a key (e.g., the PTK) of the RSTAs 404-1, . . . , 404-*n*. In operation 436, after receiving the RSTA reports from the RSTAs 404-1, . . . , 404-*n*, the LSTA 406 selects one RSTA as its forwarding RSTA, for example, based on the received signal strength indicator (RSSI) of the RSTA Polling frame at the RSTAs 404-1, . . . , 404-*n* (e.g., by selecting the RSTA with the highest RSSI value). After the LSTA 406 selects one RSTA as its forwarding RSTA, the LSTA may transmit a unicast protected action frame confirming its RSTA selection, which may include the information about the forwarding direction, such as, the selected RSTA, downlink (DL) and uplink (UL), or UL only, etc., to the AP 402 in operation 438 and the AP may transmit a unicast protected action frame to the selected RSTA (e.g., the RSTA 404-1 in FIG. 4) in operation 440 such that the RSTA can transmit a DL frame either directly to the LSTA 406 or to the LSTA 406 via the AP 402. Alternatively, after the LSTA 406 selects one RSTA as its forwarding RSTA, the LSTA may transmit to the selected RSTA (e.g., the RSTA 404-1 in FIG. 4) a frame, which may include the information about the forwarding direction such as DL and UL, or UL only, etc., confirming its RSTA selection in operation 442 and the selected RSTA 404-1 transmits the frame to the AP 402 such that the AP 402 can transmit a DL frame either directly to the LSTA 406 or to the LSTA 406 via the RSTA 404-1.

Some examples of blind forwarding and dedicated RSTA forwarding are described as follows. Before association and selecting a dedicated RSTA, a LSTA generally cannot decide a dedicated RSTA for its forwarding. In some embodiments, in a basic service set (BSS), both blind forwarding and dedicated RSTA forwarding are allowed. In some embodiments, the blind forwarding can be used for unassociated STA's association, probing, authentication. In some embodiments, the dedicated RSTA forwarding is used by an LSTA after selecting a RSTA by the LSTA.

Some examples of RSTA forwarding or without RSTA forwarding are described as follows. An LSTA may be a mobile STA and changes between RSTA's forwarding and directs frame exchanges with AP, for example, as the LSTA moves. A control frame and a data/management frame can be separately decided. In some embodiments, while the control frames are directly transmitted between an AP and an LSTA, the data frames can be forwarded by RSTA, or vice versa. DL and UL can be separately decided. In some embodiments, while DL frames are directly transmitted from an AP to an LSTA, UL frames are forwarded by an RSTA, or vice versa. The detection of the physical layer protocol data units (PPDUs) transmitted by the AP or the LSTA can be used to decide whether the RSTA forwarding is needed to not. A direct transmission polling frame (Direct Transmission Polling) can be defined where either an AP transmits the frame to an LSTA or an LSTA transmits the frame to an AP. If the frame exchange is successful, the initiator can decide whether the RSTA forwarding is not needed. The Direct Transmission Polling Feedback can be defined to report the RSSI of the received polling. The modulation and coding scheme (MCS), number of spatial streams (NSS), PPDU format used by the polling frame can be used to decide whether the control forwarding through an RSTA and/or data forwarding through is needed. An LSTA can provide DL RSTA forwarding advice based on the PPDUs transmitted by an AP. The feedback can be the RSSI of the received PPDUs transmitted by the AP, the PPDU types of the received PPDU, and/or the frame types being carried in the received PPDUs. An AP can provide UL RSTA forwarding advice to an LSTA based on the PPDUs transmitted by the LSTA. The feedback can be the RSSI of the received PPDUs transmitted by an LSTA, the PPDU types of the received PPDU, and/or the frame types being carried in the received PPDUs. The RSTA forwarding advice can be carried in High Efficiency (HE) Control field or an action frame.

In some embodiments, when a dedicated RSTA is selected for an LSTA and a PHY header carries information to identify the forwarding RSTA, the RSTA ID should be carried in the PHY header. In a first option, an RSTA ID is allocated by an AP to each RSTA. The RSTA ID space can be eight or other number. In a second option, the RSTA ID of an RSTA is acquired from RSTA's part of the RSTA's AID, e.g., three least significant bit (LSB) bits of the AID. In a third option, the RSTA ID of an RSTA is the RSTA's AID.

Figure 5:
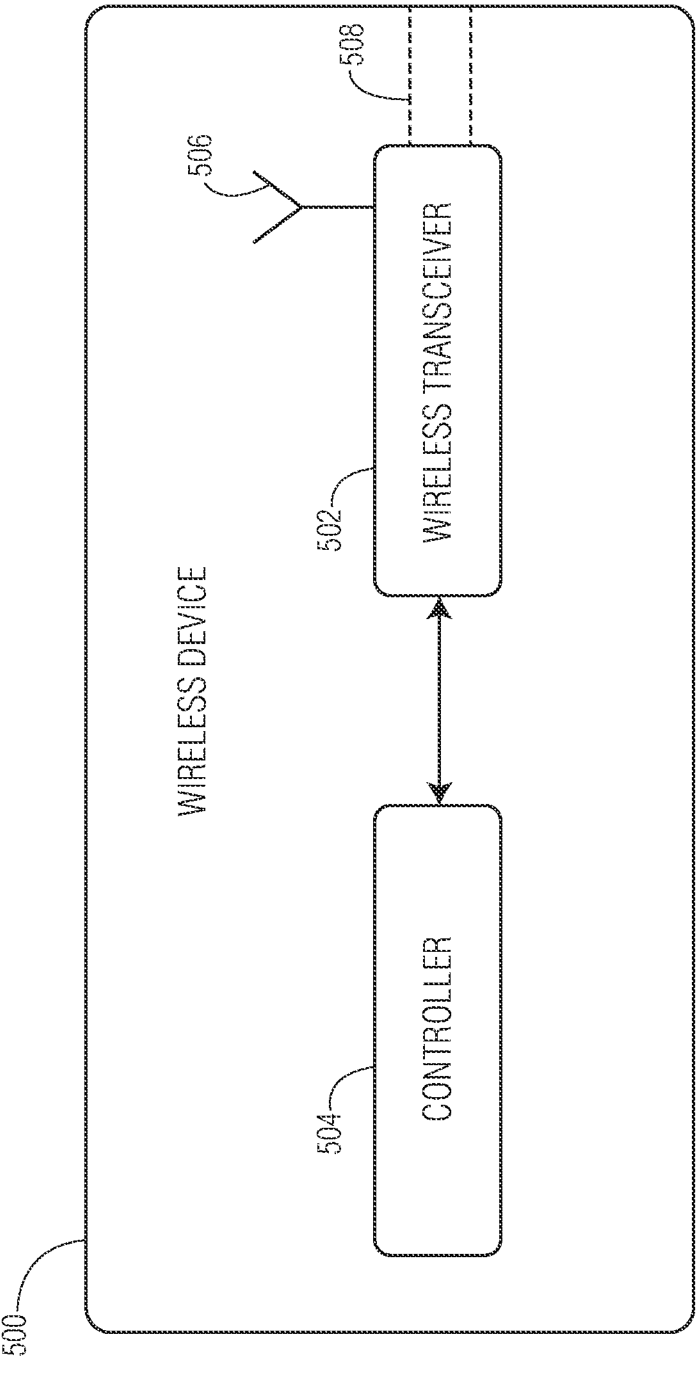
FIG. 5 depicts a wireless device in accordance with an embodiment of the invention.

FIG. 5 depicts a wireless device 500 in accordance with an embodiment of the invention. The wireless device 500 can be used in the wireless communications system 100 depicted in FIG. 1. For example, the wireless device 500 may be an embodiment of the AP 102, the RSTAs 104-1, . . . , **104-*n*, and/or the LSTA 106 depicted in FIG. 1, the AP 202, the RSTA 204, and/or the LSTA 206 depicted in FIG. 2, the AP 302, the RSTAs 304-1, . . . , 304-*n*, and/or the LSTA 306 depicted in FIG. 3, and/or the AP 402, the RSTAs 404-1, . . . , 404-*n*, and/or the LSTA 406 depicted in FIG. 4. However, the AP 102, the RSTAs 104-1, . . . , 104-*n*, and/or the LSTA 106 depicted in FIG. 1, the AP 202, the RSTA 204, and/or the LSTA 206 depicted in FIG. 2, the AP 302, the RSTAs 304-1, . . . , 304-*n*, and/or the LSTA 306 depicted in FIG. 3, and/or the AP 402, the RSTAs 404-1, . . . , 404-*n*, and/or the LSTA 406 depicted in FIG. 4 are not limited to the embodiment depicted in FIG. 5. The wireless device 500 may be a wireless relay device. In some embodiments, the wireless device 500 is a dedicated relay device. In some embodiments, the wireless device 500 is a non-AP wireless station with a relaying function enabled. In some embodiments, the wireless device 500 is an AP with a relaying function enabled. For example, the wireless device 500 may be an embodiment of the RSTAs 104-1, . . . , 104-*n* depicted in FIG. 1, the RSTA 204 depicted in FIG. 2, the RSTAs 304-1, . . . , 304-*n* depicted in FIG. 3, and/or the RSTAs 404-1, . . . , 404-*n* depicted in FIG. 4**.

In the embodiment depicted in FIG. 5, the wireless device 500 includes a wireless transceiver 502, a controller 504 operably connected to the wireless transceiver, and at least one antenna 506 operably connected to the wireless transceiver. In some embodiments, the wireless device 500 may include at least one optional network port 508 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 500 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. In some embodiments, the wireless device is compatible with an Institute of Electrical and Electronics Engineers (IEEE) 802.11 protocol. In some embodiments, the wireless device is a component of a multi-link device (MLD).

In accordance with an embodiment of the invention, the controller 504 is select a wireless relay device from multiple wireless relay devices for data exchanges between the wireless device 500 and a second wireless device and the wireless transceiver 502 is configured to exchange data with the second wireless device through the selected wireless relay device. In some embodiments, the wireless relay devices are located between the wireless device 500 and the second wireless device. In some embodiments, the wireless device is a leaf station (STA) (LSTA), and the second wireless device is a wireless access point (AP). In some embodiments, the wireless relay devices are located between the LSTA and the wireless AP. In some embodiments, the wireless transceiver is further configured to broadcast a polling frame to the wireless relay devices. In some embodiments, the wireless transceiver is further configured to receive polling reports from the wireless relay devices in response to the polling frame, and the controller is further configured to select the wireless relay device from the wireless relay devices for data exchanges between the wireless device 500 and the second wireless device based on the polling reports. In some embodiments, the wireless transceiver is further configured to receive a polling report collection from the second wireless device that is generated in response to polling reports from the wireless relay devices that is received at the second wireless device in response to the polling frame. In some embodiments, the controller is further configured to select the wireless relay device from the wireless relay devices for data exchanges between the wireless device 500 and the second wireless device based on the polling report collection. In some embodiments, the controller is further configured to generate a frame confirming wireless relay device selection, and the wireless transceiver is further configured to transmit the frame to the second wireless device. In some embodiments, the controller is further configured to generate a frame confirming wireless relay device selection, and the wireless transceiver is further configured to transmit the frame to the selected wireless relay device. In some embodiments, the wireless transceiver is further configured to transmit to the second wireless device a downlink relay station forwarding advice that is based on physical layer protocol data units (PPDUs) transmitted by the second wireless device or to receive an uplink (UL) relay station forwarding advice from the second wireless device. In some embodiments, the wireless device 500 is compatible with an IEEE 802.11 protocol.

Figure 6:
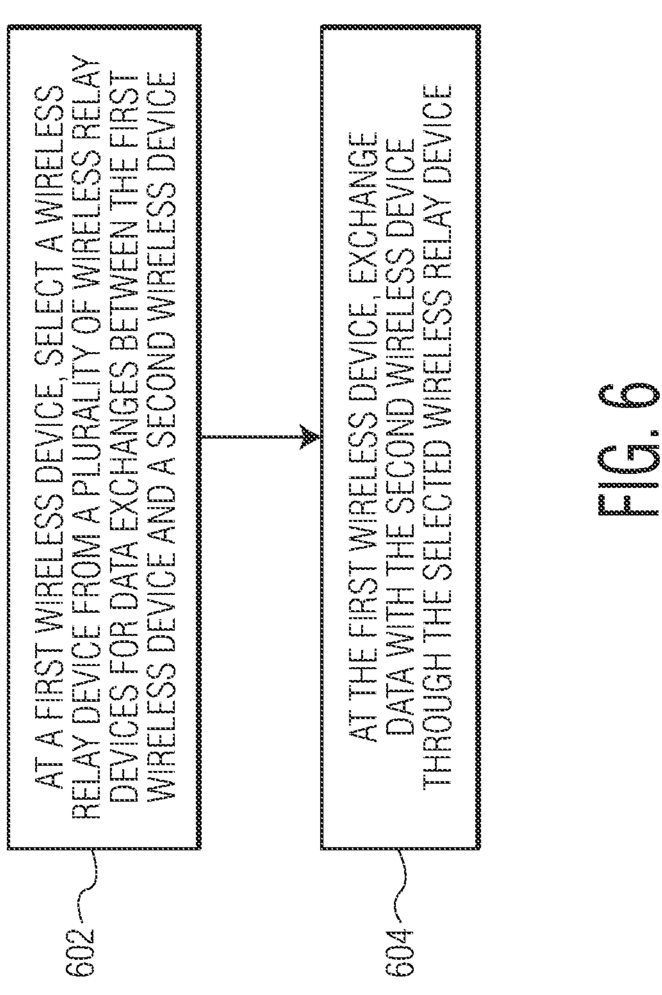
FIG. 6 is a process flow diagram of a method for wireless communications in accordance with an embodiment of the invention.

FIG. 6 is a process flow diagram of a method for wireless communications in accordance with an embodiment of the invention. At block 602, at a first wireless device, a wireless relay device is selected from multiple wireless relay devices for data exchanges between the first wireless device and a second wireless device. At block 604, at the first wireless device, data is exchanged with the second wireless device through the selected wireless relay device. In some embodiments, the wireless relay devices are located between the first wireless device and the second wireless device. In some embodiments, the first wireless device includes an LSTA, and the second wireless device includes a wireless AP, and the wireless relay devices are located between the LSTA and the wireless AP. In some embodiments, the method further includes from the first wireless device, broadcasting a polling frame to the wireless relay devices. In some embodiments, the method further involves at the first wireless device, receiving polling reports from the wireless relay devices in response to the polling frame, where at the first wireless device, selecting the wireless relay device from the wireless relay devices for data exchanges between the first wireless device and the second wireless device includes at the first wireless device, selecting the wireless relay device from the wireless relay devices for data exchanges between the first wireless device and the second wireless device based on the polling reports. In some embodiments, the method further includes receiving a polling report collection from the second wireless device that is generated in response to polling reports from the wireless relay devices that is received at the second wireless device in response to the polling frame, wherein at the first wireless device, selecting the wireless relay device from the wireless relay devices for data exchanges between the first wireless device and the second wireless device includes at the first wireless device, selecting the wireless relay device from the wireless relay devices for data exchanges between the first wireless device and the second wireless device based on the polling report collection. The first wireless device and/or the second wireless device may be the same as or similar to the LSTA 106 or the AP 102 depicted in FIG. 1, the LSTA 206 or the AP 202 depicted in FIG. 2, the LSTA 306 or the AP 302 depicted in FIG. 3, and/or the LSTA 406 or the AP 402 depicted in FIG. 4. The wireless relay devices may be the same as or similar to the RSTAs 104-1, . . . , **104-*n* depicted in FIG. 1, the RSTA 204 depicted in FIG. 2, the RSTAs 304-1, . . . , 304-*n* depicted in FIG. 3, and/or the RSTAs 404-1, . . . , 404-*n* depicted in FIG. 4**.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless device comprising:

a wireless transceiver configured to broadcast a polling frame to wireless relay devices;

wherein the wireless transceiver is further configured to receive a plurality of polling reports from the wireless relay devices in response to the polling frame, a controller configured to select a wireless relay device from the wireless relay devices for data exchanges between the wireless device and a second wireless device; wherein the controller is further configured to select the wireless relay device from the wireless relay devices for data exchanges between the wireless device and the second wireless device based on the polling reports; and a wireless transceiver configured to exchange data with the second wireless device through the selected wireless relay device.

2. The wireless device of claim 1, wherein the wireless relay devices are located between the wireless device and the second wireless device.

3. The wireless device of claim 1, wherein the wireless device comprises a leaf station (STA) (LSTA), and wherein the second wireless device comprises a wireless access point (AP).

4. The wireless device of claim 3, wherein the wireless relay devices are located between the LSTA and the wireless AP.

5. A wireless device comprising:

a wireless transceiver configured to broadcast a polling frame to wireless relay devices;

wherein the wireless transceiver is further configured to receive a polling report collection from a second wireless device that is generated in response to a plurality of polling reports from the wireless relay devices that is received at the second wireless device in response to the polling frame;

a controller configured to select a wireless relay device from the wireless relay devices for data exchanges between the wireless device and the second wireless device; and a wireless transceiver configured to exchange data with the second wireless device through the selected wireless relay device.

6. The wireless device of claim 5, wherein the controller is further configured to select the wireless relay device from the wireless relay devices for data exchanges between the wireless device and the second wireless device based on the polling report collection.

7. The wireless device of claim 1, wherein the controller is further configured to generate a frame confirming wireless relay device selection, and wherein the wireless transceiver is further configured to transmit the frame to the second wireless device.

8. The wireless device of claim 1, wherein the controller is further configured to generate a frame confirming wireless relay device selection, and wherein the wireless transceiver is further configured to transmit the frame to the selected wireless relay device.

9. The wireless device of claim 1, wherein the wireless transceiver is further configured to transmit to the second wireless device a downlink relay station forwarding advice that is based on a plurality of physical layer protocol data units (PPDUs) transmitted by the second wireless device or to receive an uplink (UL) relay station forwarding advice from the second wireless device.

10. A wireless leaf station (STA) (LSTA) compatible with an Institute of Electrical and Electronics Engineers (IEEE) 802.11 protocol, wherein the wireless LSTA comprises:

a wireless transceiver configured to broadcast a polling frame to wireless relay devices and receive a plurality of polling reports from the wireless relay devices in response to the polling frame;

a controller configured to select a wireless relay device from the wireless relay devices for data exchanges between the wireless LSTA and a wireless access point (AP), wherein the wireless relay devices are located between the wireless LSTA and a wireless AP;

wherein the controller is further configured to select the wireless relay device from the wireless relay devices for data exchanges between the wireless LSTA and the wireless AP based on the polling reports and to generate a frame confirming wireless relay device selection, and wherein the wireless transceiver is further configured to transmit the frame confirming the wireless relay device selection to the wireless AP and exchange data with the wireless AP through the selected wireless relay device.

11. The wireless LSTA of claim 10, wherein the wireless transceiver is further configured to broadcast a polling frame to the wireless relay devices.

12. A method for wireless communications, the method comprising:

from a first wireless device, broadcasting a polling frame to wireless relay devices;

at the first wireless device, receiving a plurality of polling reports from the wireless relay devices in response to the polling frame;

at a first wireless device, selecting a wireless relay device from a plurality of wireless relay devices for data exchanges between the first wireless device and a second wireless device;

wherein at the first wireless device, selecting the wireless relay device from the wireless relay devices for data exchanges between the first wireless device and the second wireless device comprises at the first wireless device, selecting the wireless relay device from the wireless relay devices for data exchanges between the first wireless device and the second wireless device based on the polling reports; and at the first wireless device, exchanging data with the second wireless device through the selected wireless relay device.

13. The method of claim 12, wherein the wireless relay devices are located between the first wireless device and the second wireless device.

14. The method of claim 12, wherein the first wireless device comprises a leaf station (STA) (LSTA), wherein the second wireless device comprises a wireless access point (AP), and wherein the wireless relay devices are located between the LSTA and the wireless AP.

15. A method for wireless communications, the method comprising:

from a first wireless device, broadcasting a polling frame to wireless relay devices;

receiving a polling report collection from a second wireless device that is generated in response to a plurality of polling reports from the wireless relay devices that is received at the second wireless device in response to the polling frame;

at a first wireless device, selecting a wireless relay device from a plurality of wireless relay devices for data exchanges between the first wireless device and a second wireless device;

wherein at the first wireless device, selecting the wireless relay device from the wireless relay devices for data exchanges between the first wireless device and the second wireless device comprises at the first wireless device, selecting the wireless relay device from the wireless relay devices for data exchanges between the first wireless device and the second wireless device based on the polling report collection; and at the first wireless device, exchanging data with the second wireless device through the selected wireless relay device.

* * * * *